(12) United States Patent
Fung et al.

(10) Patent No.: US 10,951,097 B2
(45) Date of Patent: Mar. 16, 2021

(54) ROTOR, MANUFACTURING METHOD OF THE ROTOR, AND MOTOR

(71) Applicant: Johnson Electric S.A., Murten (CH)

(72) Inventors: Chi Ho Fung, Hong Kong (CN); Kar Wai Lam, Hong Kong (CN); Yung Fai Tsui, Hong Kong (CN); Wei Liang Huang, Shenzhen (CN); Yi Li, Shenzhen (CN); Deng Zhi Huang, Shenzhen (CN)

(73) Assignee: Johnson Electric International AG, Murten (CH)

( * ) Notice: Subject to any disclaimer, the term of this patent is extended or adjusted under 35 U.S.C. 154(b) by 723 days.

(21) Appl. No.: 15/633,034

(22) Filed: Jun. 26, 2017

(65) Prior Publication Data
US 2017/0373569 A1 Dec. 28, 2017

(30) Foreign Application Priority Data
Jun. 28, 2016 (CN) .......................... 201610489989.6

(51) Int. Cl.
| | | |
|---|---|---|
| *H02K 1/27* | (2006.01) | |
| *H02K 7/14* | (2006.01) | |
| *H02K 9/02* | (2006.01) | |
| *H02K 9/04* | (2006.01) | |
| *H02K 9/06* | (2006.01) | |
| *H02K 15/03* | (2006.01) | |
| *H02K 21/16* | (2006.01) | |
| *B29C 45/14* | (2006.01) | |
| *H02K 15/16* | (2006.01) | |

(Continued)

(52) U.S. Cl.
CPC ............. *H02K 15/03* (2013.01); *B29C 45/14* (2013.01); *H02K 1/276* (2013.01); *H02K 9/06* (2013.01); *H02K 15/16* (2013.01); *H02K 21/16* (2013.01); *B29L 2031/08* (2013.01); *H02K 5/20* (2013.01); *H02K 15/02* (2013.01); *H02K 99/20* (2016.11); *H02K 2205/03* (2013.01)

(58) Field of Classification Search
CPC ............ H02K 1/27; H02K 1/276; H02K 1/28; H02K 7/14; H02K 9/02; H02K 9/04; H02K 9/06; H02K 15/03; H02K 15/16; H02K 21/02; B25F 5/00; B25F 5/008
See application file for complete search history.

(56) References Cited

U.S. PATENT DOCUMENTS

| | | | | |
|---|---|---|---|---|
| 2,546,846 A | * | 3/1951 | Atkin ..................... | H02K 7/145 310/83 |
| 3,652,879 A | * | 3/1972 | Plunkett ................. | B25F 5/008 310/50 |

(Continued)

FOREIGN PATENT DOCUMENTS

| | | |
|---|---|---|
| CN | 201307810 Y | 9/2009 |
| CN | 104300710 A | 1/2015 |
| CN | 104753215 A | 7/2015 |

*Primary Examiner* — Edgardo San Martin
(74) *Attorney, Agent, or Firm* — Muncy, Geissler, Olds and Lowe. P.C.

(57) ABSTRACT

A rotor, which includes a rotor main body and a fan. The rotor main body includes a rotor core, a rotary shaft extending through the rotor core, and a permanent magnet mounted in the rotor core. The fan includes a plurality of fixing portions embedded in the rotor main body and configured to fix the permanent magnet. The rotor has a simple structure, can be easily assembled, and has a low cost.

15 Claims, 7 Drawing Sheets

(51) Int. Cl.
   *H02K 1/28* (2006.01)
   *H02K 5/20* (2006.01)
   *H02K 99/00* (2014.01)
   *B29L 31/08* (2006.01)
   *H02K 15/02* (2006.01)

(56) References Cited

U.S. PATENT DOCUMENTS

| | | | | |
|---|---|---|---|---|
| 5,315,193 A * | 5/1994 | Kummer | ............ | B23D 59/006 |
| | | | | 310/50 |
| 6,543,549 B1 * | 4/2003 | Riedl | ............ | B25B 21/00 |
| | | | | 173/171 |
| 7,166,939 B2 * | 1/2007 | Voigt | ............ | B25F 5/008 |
| | | | | 310/47 |
| 7,330,006 B2 * | 2/2008 | Iwata | ............ | B25F 5/008 |
| | | | | 318/400.41 |
| 8,334,626 B2 * | 12/2012 | Lange | ............ | B25F 5/008 |
| | | | | 310/47 |
| 8,338,994 B2 * | 12/2012 | Tanimoto | ............ | H02K 9/06 |
| | | | | 310/180 |
| 8,410,645 B2 * | 4/2013 | Lau | ............ | B25F 5/008 |
| | | | | 173/217 |
| 8,508,084 B2 * | 8/2013 | Satterfield | ............ | B25F 5/02 |
| | | | | 310/50 |
| 8,803,377 B2 * | 8/2014 | Lau | ............ | B25F 5/008 |
| | | | | 310/50 |
| 9,048,699 B2 * | 6/2015 | Oomori | ............ | H02K 11/33 |
| 9,124,145 B2 * | 9/2015 | Lau | ............ | H02K 9/06 |
| 9,369,014 B2 * | 6/2016 | Kawasaki | ............ | H02K 1/2706 |
| 9,755,490 B2 * | 9/2017 | Inuzuka | ............ | B25F 5/00 |
| 10,432,045 B2 * | 10/2019 | Hessenberger | ............ | H02K 5/15 |
| 2006/0261689 A1 * | 11/2006 | Natsuhara | ............ | H02K 11/33 |
| | | | | 310/64 |
| 2008/0290745 A1 * | 11/2008 | Riedl | ............ | B25F 5/008 |
| | | | | 310/50 |
| 2011/0227430 A1 * | 9/2011 | Omori | ............ | B25F 5/008 |
| | | | | 310/50 |
| 2014/0124231 A1 * | 5/2014 | Hessenberger | ............ | B25F 5/006 |
| | | | | 173/217 |
| 2014/0125158 A1 * | 5/2014 | Hessenberger | ............ | H02K 1/276 |
| | | | | 310/50 |
| 2015/0180307 A1 * | 6/2015 | Inuzuka | ............ | B25F 5/008 |
| | | | | 310/50 |
| 2018/0111244 A1 * | 4/2018 | Blickle | ............ | H02K 7/075 |
| 2019/0260266 A1 * | 8/2019 | Hessenberger | ............ | H02K 7/145 |

* cited by examiner

ROTOR, MANUFACTURING METHOD OF THE ROTOR, AND MOTOR

CROSS REFERENCE TO RELATED APPLICATIONS

This non-provisional patent application claims priority under 35 U.S.C. § 119(a) from Patent Application No. 201610489989.6 filed in The People's Republic of China on Jun. 28, 2016.

FIELD OF THE INVENTION

The present disclosure relates to motors, and in particular to a rotor of a motor, a manufacturing method of the rotor, and a motor.

BACKGROUND OF THE INVENTION

A rotor is used to cooperate with a stator, and rotate relative to the stator under the action of electromagnetic force, thereby driving a load connected to the rotor to rotate. A direct current motor, of which a rotor generally includes a rotary shaft, a rotor core, and a permanent magnet embedded in the rotor core. In order to cool the motor, a fan is generally mounted on an end of the rotor, and is driven by the rotor to rotate to cool the motor.

However, an assemble process of the motor with fan is complex.

SUMMARY OF THE INVENTION

Accordingly, there is a desire for a rotor which can be easily assembled, and a method for manufacturing the rotor. There is also a need for a motor including the rotor.

In one aspect, a rotor includes a rotor main body and a fan. The rotor main body comprises a rotor core, a rotary shaft extending through the rotor core and a permanent magnet mounted in the rotor core. The fan comprises a plurality of fixing portions embedded in the rotor main body and configured to fix the permanent magnet.

Preferably, the fan further comprises a top cover and an impeller that are disposed at two ends of the fixing portions, two ends of the rotary shaft extend through the impeller and the top cover, respectively, the rotor core is disposed between the impeller and the top cover, the permanent magnet is wrapped in the fixing portions, and the fixing portions are embedded in the rotor core.

Preferably, the top cover, the impeller, and the fixing portions are integrally formed through injection molding.

Preferably, the fixing portions wrap the permanent magnet via an over-molding process.

Preferably, the fan further comprises a connection portion, the connection portion is disposed between the impeller and the fixing portion, one end of each fixing portion extending through one of the mounting grooves is connected to the connection portion, and the other end of each fixing portion is connected to the top cover.

Preferably, a plurality of positioning holes is defined in the rotor core along a direction parallel to an axis of the rotor core, a plurality of positioning pins are disposed on the top cover, and each positioning pin is inserted in and extends through one of the positioning holes and is connected to the connection portion.

Preferably, a plurality of recesses are defined in two ends of the rotor core, respectively, a plurality of positioning pins are disposed on the connection portion and the top cover, and each positioning pin is inserted in one of the recesses.

Preferably, the top cover abuts against an end of the rotor core, a sleeve is disposed at a side of the top cover, and an end of the rotary shaft extends sequentially through the top cover and the sleeve.

Preferably, an outer circumferential surface of the rotor core is in an irregular round shape, the outer circumferential surface of the rotor core comprises a plurality of arc surfaces and a plurality of transition surfaces, and the arc surfaces and the transition surfaces are alternately arranged.

Preferably, the rotary shaft tightly fits the rotor core.

Preferably, a plurality of mounting grooves is defined in the rotor core, and each of the fixing portions is accommodated in one of the mounting grooves.

Preferably, two air grooves are disposed at two ends of each of the mounting grooves, and each air groove is communicated with one corresponding mounting groove, a lug extends from each of two side of each fixing portion, and the lug is held in one of the air grooves.

Preferably, a cross section of each air groove is a triangle in shape, and each air groove is located at one side of the corresponding mounting groove adjacent the corresponding transition surface.

In another aspect, a manufacturing method of a rotor includes the following steps:
providing a rotor core, a rotary shaft and a plurality of permanent magnets, a plurality of mounting grooves being formed in the rotary core, and an air groove being formed at each of two sides of each mounting groove and communicated with the each mounting groove;
extending the rotary shaft through the rotor core along an axis of the rotor core and fixing the rotary shaft to the rotor core, each permanent magnet being accommodated in one of the mounting grooves;
placing the rotor core, the rotary shaft and the permanent magnets that have been assembled into a mold, with each permanent magnet located in a middle of the one of the mounting grooves;
injecting high pressure melting plastic into the mold, thereby forming a fan through injection molding; and
removing the rotor composed of the rotor main body and the fan from the mold through a demolding mechanism.

Preferably, the melting plastic is filled in the mounting groove and the air grooves to form a fixing portion at an outside of the permanent magnet to wrap the permanent magnet, and form lugs mating with the air grooves at two sides of each fixing portion, and the melting plastic is filled in positioning holes to form positioning pins.

In another aspect, a motor includes a stator and an endcap disposed at an end of the stator. The motor further comprises the rotor described above, and the rotor is supported by the endcap and is rotatably received in the stator.

In still another aspect, a power tool includes the motor described above.

The rotor of the present disclosure includes the rotor main body and the fan which are embedded with each other, and the fan is integrally formed on the rotor main body via injection molding, thereby solving the problems in the conventional rotor assembly process that there are an unduly large amount of assembly parts and the assembly process is complex. Further, by forming the fixing portion at the outside of the permanent magnet via injection molding, the permanent magnet is sealed, and it can be ensured that a position of the permanent magnet will not be changed as well. The lugs extending along two sides of each fixing portion, used in combination with the air grooves, further enhance the effect of magnetic isolation, and also make the connection between the fan and the rotor main body even tighter.

DETAILED DESCRIPTION OF THE PREFERRED EMBODIMENTS

Below, embodiments of the present disclosure will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

It should be noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Figure 1:
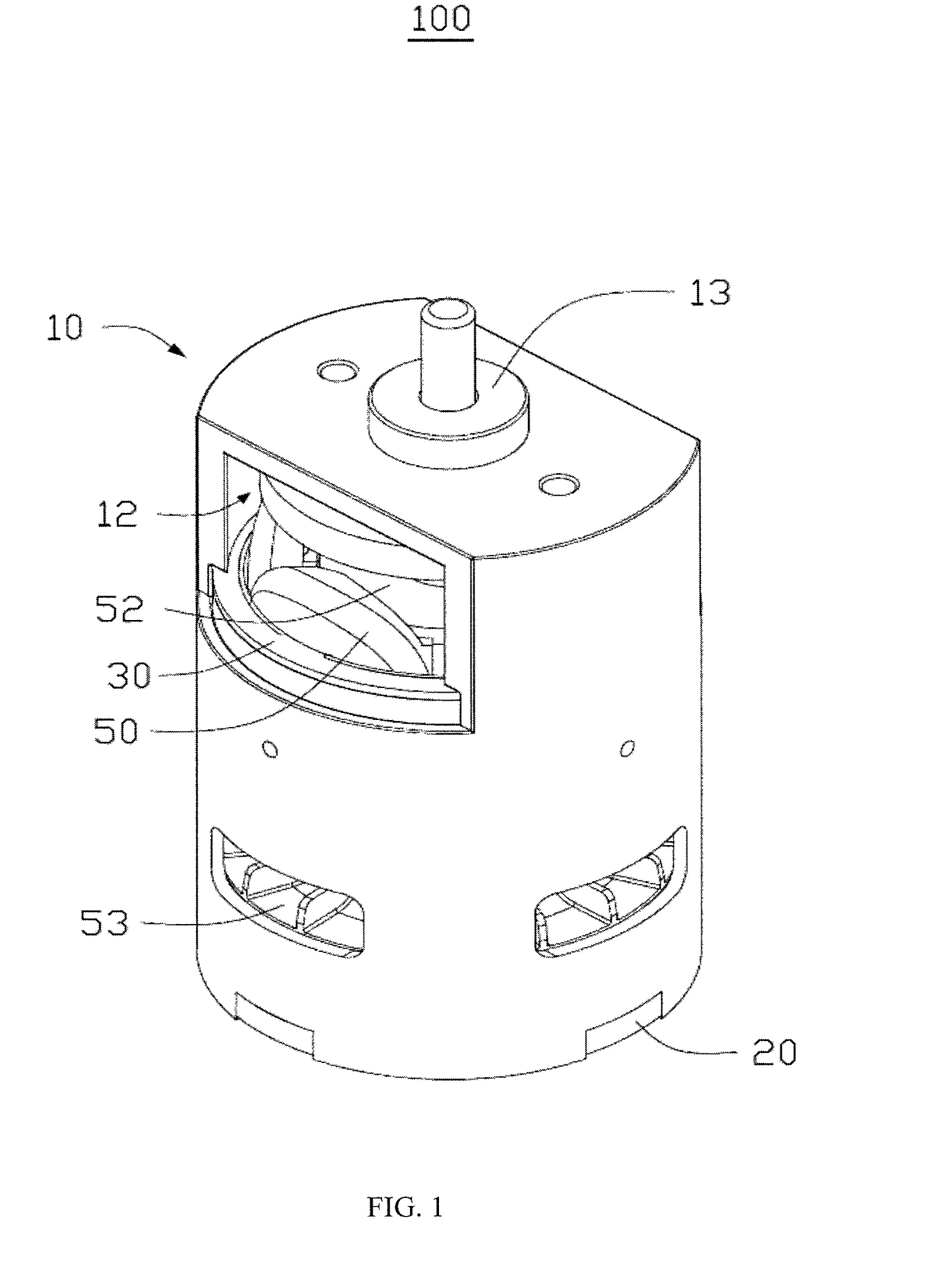
FIG. 1 is a perspective view of a motor according to an embodiment of the present disclosure.

Referring to FIG. 1, a rotor 50 of one embodiment of the present disclosure is a permanent magnet rotor, which is applied in a motor 100. The motor 100 may be, but not limited to, a single-phase motor, or a multi-phase motor. In this embodiment, the motor 100 is a single-phase permanent magnet motor. The motor 100 further includes a housing 10, an endcap 20 disposed at an end of the housing 10 and a stator 30. The stator 30 is mounted in the housing 10. The rotor 50 is rotatably received in the stator 30, and rotates relative to the stator 30 under an electromagnetic force. Two ends of the rotor 50 are supported by bearings disposed at the endcap 20 and the housing 10.

In this embodiment, a plurality of hollow portions 12 is defined in the housing 10. The hollow portions 12 are used to reduce a weight of the motor 100, and facilitate heat dissipation of the motor 100. A bearing seat 13 is disposed at an end of the housing 10, and a bearing seat 23 is disposed at the endcap 20. The two bearing seats 13, 23 are used to mount the bearings for supporting the rotor 50.

Figure 2:
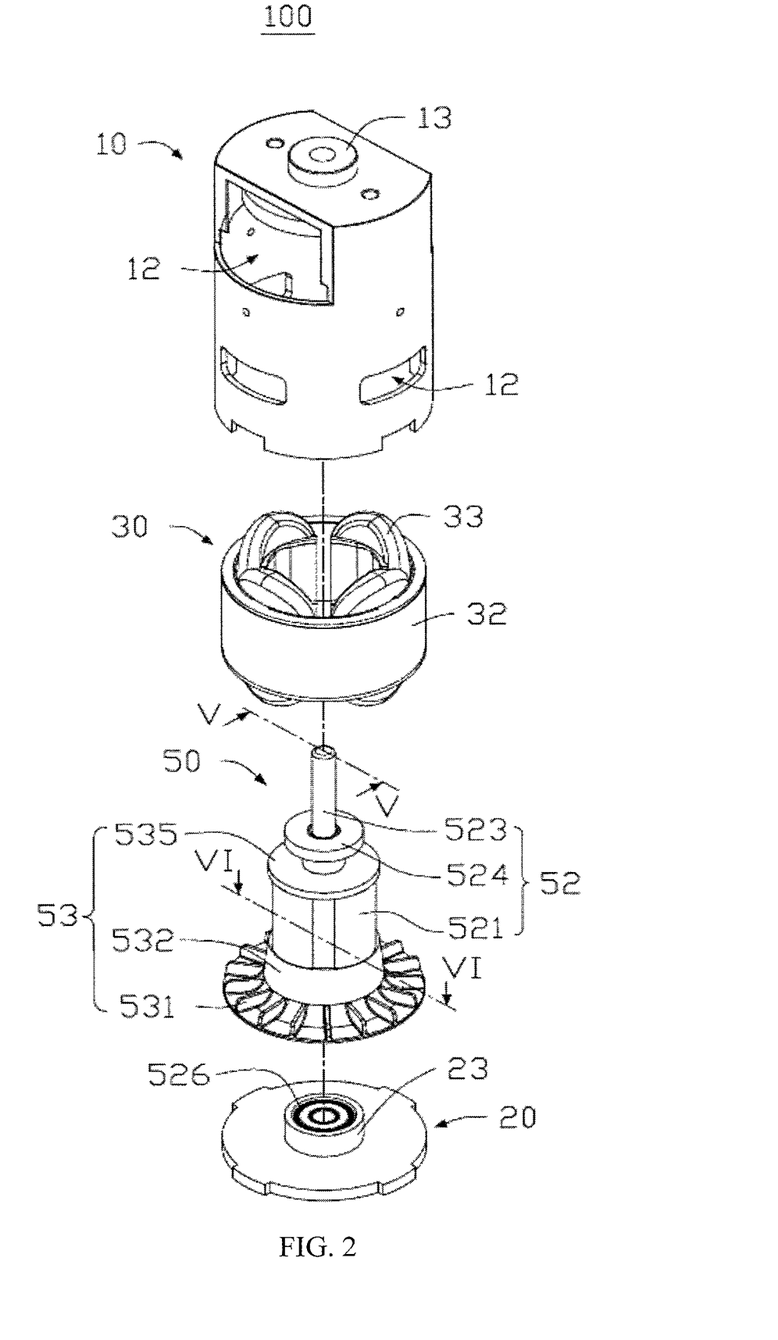
FIG. 2 is an exploded view of the motor shown in FIG. 1.
Figure 3:
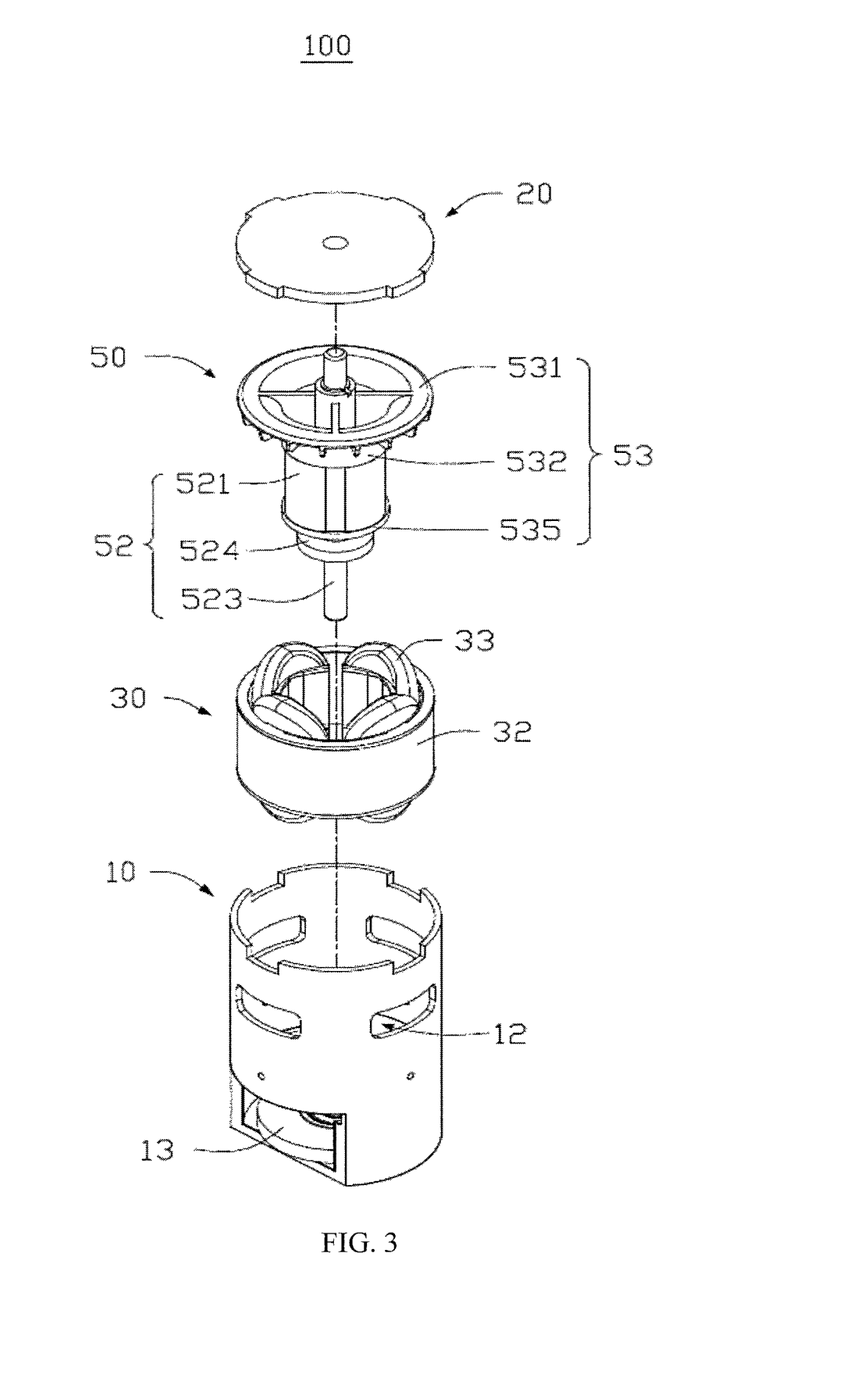
FIG. 3 is an exploded view of the motor shown in FIG. 1, viewed from another direction.
Figure 4:
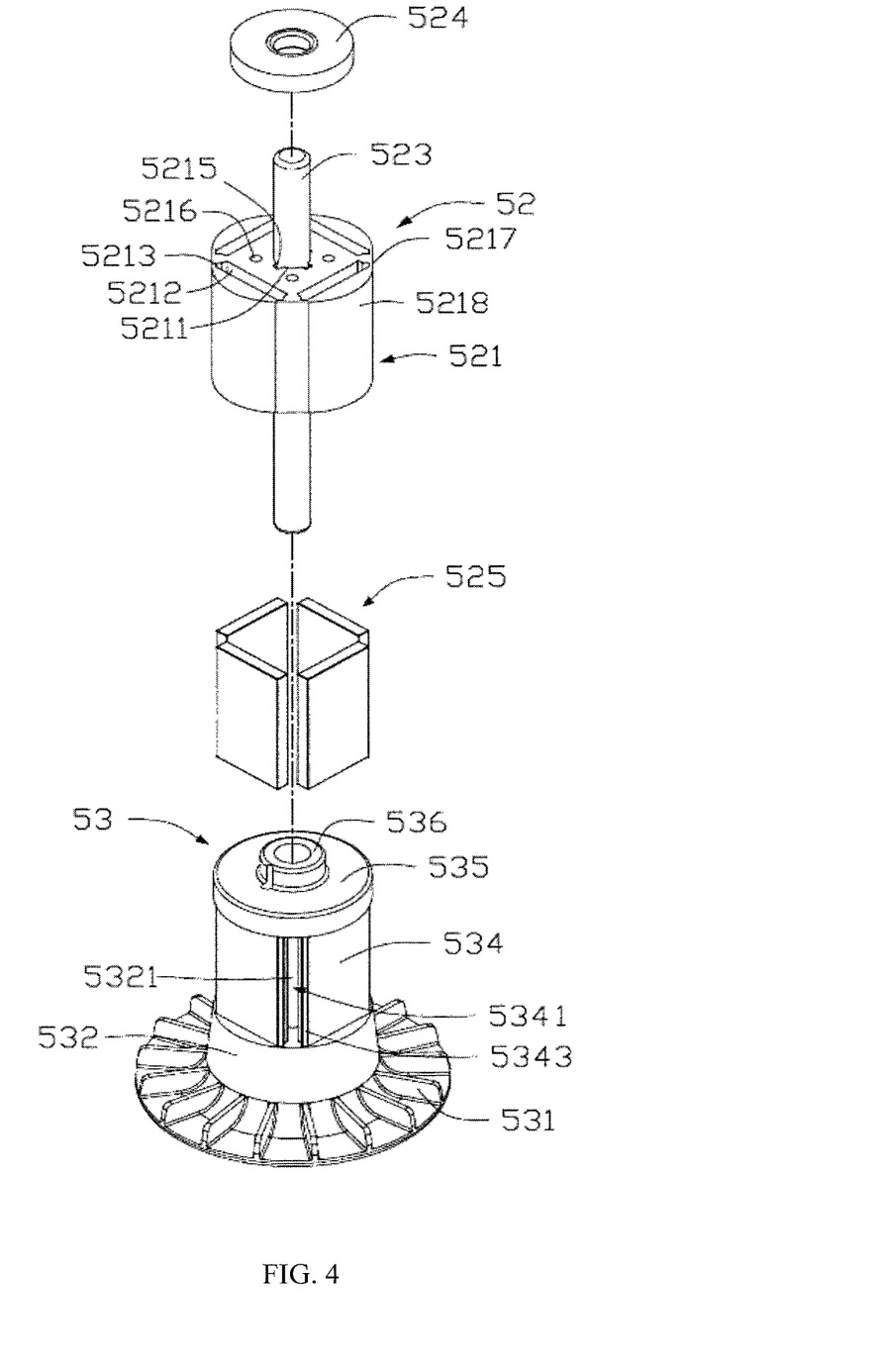
FIG. 4 is an exploded view of a rotor shown in FIG. 2.

Referring to FIG. 2 and FIG. 3, the rotor 50 can include a rotor main body 52 and a fan 53. In this embodiment, the rotor main body 52 and the fan 53 are embedded with each other to form a unitary body. The rotor main body 52 can include a rotor core 521, a rotary shaft 523 and a plurality of permanent magnets 525. The rotary shaft 523 extends through the rotor core 521 along an axis of the rotor core 521. The rotary shaft 523 is fixed in the rotor core 521 and intimately fits with the rotor core 521. Two ends of the rotary shaft 523 are supported at the housing 10 and the endcap 20 of the motor 100 through bearings 526, respectively. Referring also to FIG. 4, a shaft hole 5211 is defined in the rotor core 521 along the axis of the rotor core 521 for mounting the rotary shaft 523. A plurality of mounting grooves 5212 and a plurality of positioning holes 5214 are defined in the rotor core 521. Each of the mounting grooves 5212 and the positioning holes 5214 extends through the rotor core 521 along a direction parallel to the axis of the rotor core 521. The mounting grooves 5212 are used to accommodate the permanent magnet 525 and partially accommodate the fan 53. The mounting grooves 5212 are evenly disposed in the rotor core 521 and centered around the axis of the rotor core 521. The positioning holes 5214 are used to hold the fan 53. The positioning holes 5214 are evenly disposed in the rotor core 521 and centered around the axis of the rotor core 521. A plurality of mating holes 5215 are defined in the rotor core 521. The mating holes 5215 are defined in a circumferential surface of the shaft hole 5211 of the rotor core 521, and are communicated with the shaft hole 5211. The mating holes 5215 are used to hold the fan 53.

It should be understood that, in other embodiments of the present disclosure, the positioning holes 5214 may also be recesses 5216 disposed at two ends of the rotor core 521, and the recesses 5216 are used to hold the fan 53.

An outer circumferential surface of the rotor core 521 is in an irregular round shape. The outer circumferential surface of the rotor core 521 includes a plurality of arc surfaces 5217 and a plurality of transition surfaces 5218, and the arc surfaces 5217 and the transition surfaces 5218 are alternately arranged. The presence of the arc surfaces 5217 and the transition surfaces 5218 results in an uneven air gap being formed between the rotor core 521 and the stator 30, so that the motor 100 can avoid a startup dead point. In this embodiment, a plurality of air grooves 5213 is disposed in the rotor core 521. Two of the air grooves 5213 are disposed at two ends of each mounting groove 5212 at one side thereof adjacent a transition surface 5218, and each air groove 5213 is communicated with the corresponding mounting groove 5212. In this embodiment, a cross section of the air groove 5213 perpendicular to an axis of the rotor main body 52 is a triangle in shape. A length of a bottom of the air groove 5213 is less than a length of the mounting groove 5212, and a distance between the transition surface 5218 and a lateral side of the air groove is as small as possible so as to reduce magnetic circuit loss. The air grooves 5213 are further used to prevent short circuit of magnetic flux of two adjacent permanent magnets 525. It should be understood that the rotor core 521 is formed by stacking sequentially a plurality of magnetic conductive laminations. The magnetic conductive laminations are made of soft magnetic material having magnetic permeability, such as silicon steel sheet, permalloy, or ferrite.

In this embodiment, there are four permanent magnets 525. Each permanent magnet 525 is accommodated in one mounting groove 5212 to form one rotor pole. The rotor 50 further includes a magnetic ring 524. The magnetic ring 524 is disposed around one end of the rotary shaft 523. The magnetic ring 524 abuts against the fan 53 adjacent one end of the housing 10 where the bearing seat 13 is disposed, and rotates along with the rotary shaft 523. The magnetic ring 524 is used to limit displacement of the rotor core 521 and the fan 53 along an axial direction of the rotary shaft 523.

The fan 53 and the rotor main body 52 are embedded with each other, and the fan 53 rotates along with the rotor main body 52 for cooling the motor 100. In this embodiment, the fan 53 is formed on the rotor main body 52 through injection molding.

Figure 5:
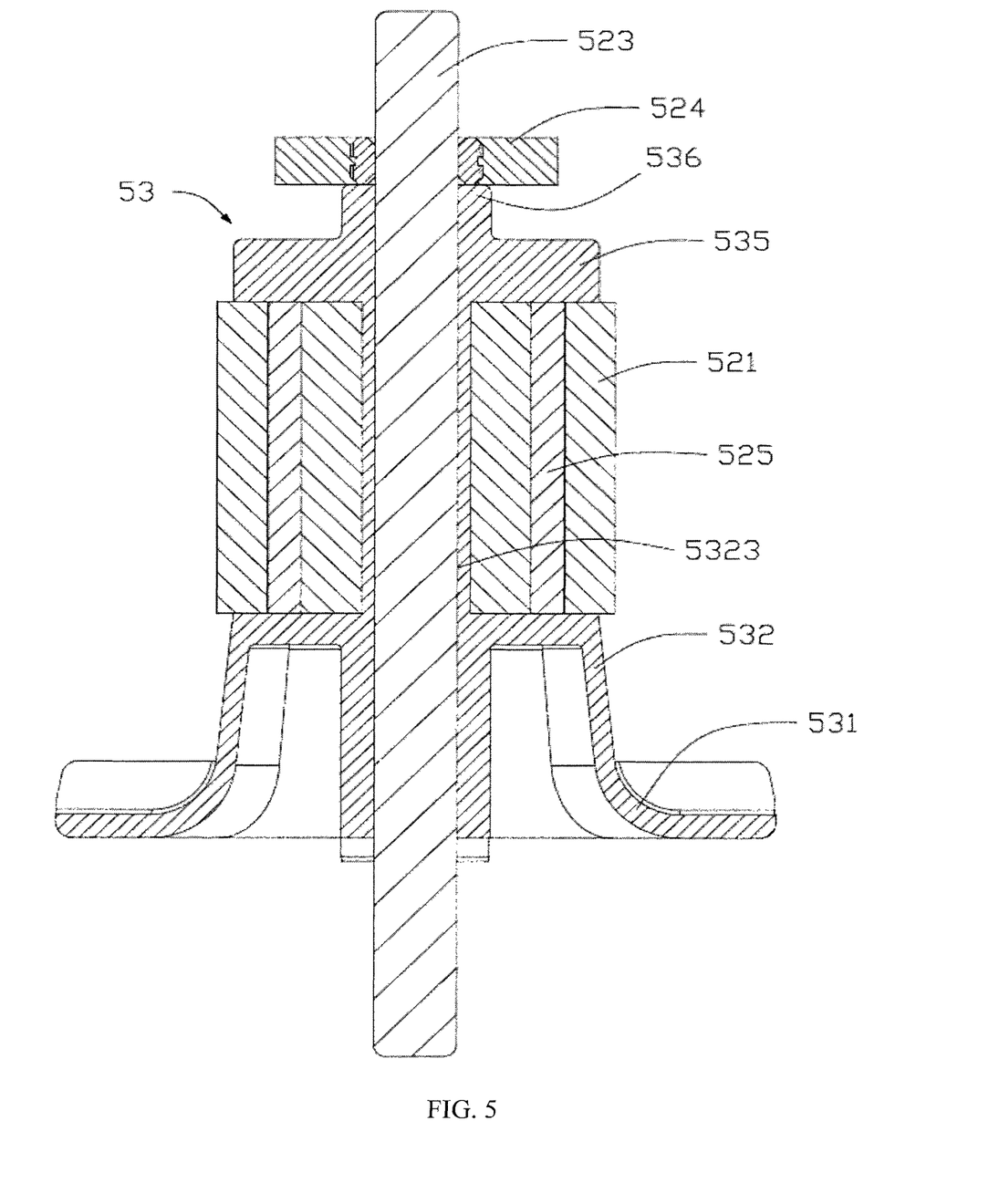
FIG. 5 is a sectional view of the rotor shown in FIG. 2 take alone line V-V thereof.
Figure 6:
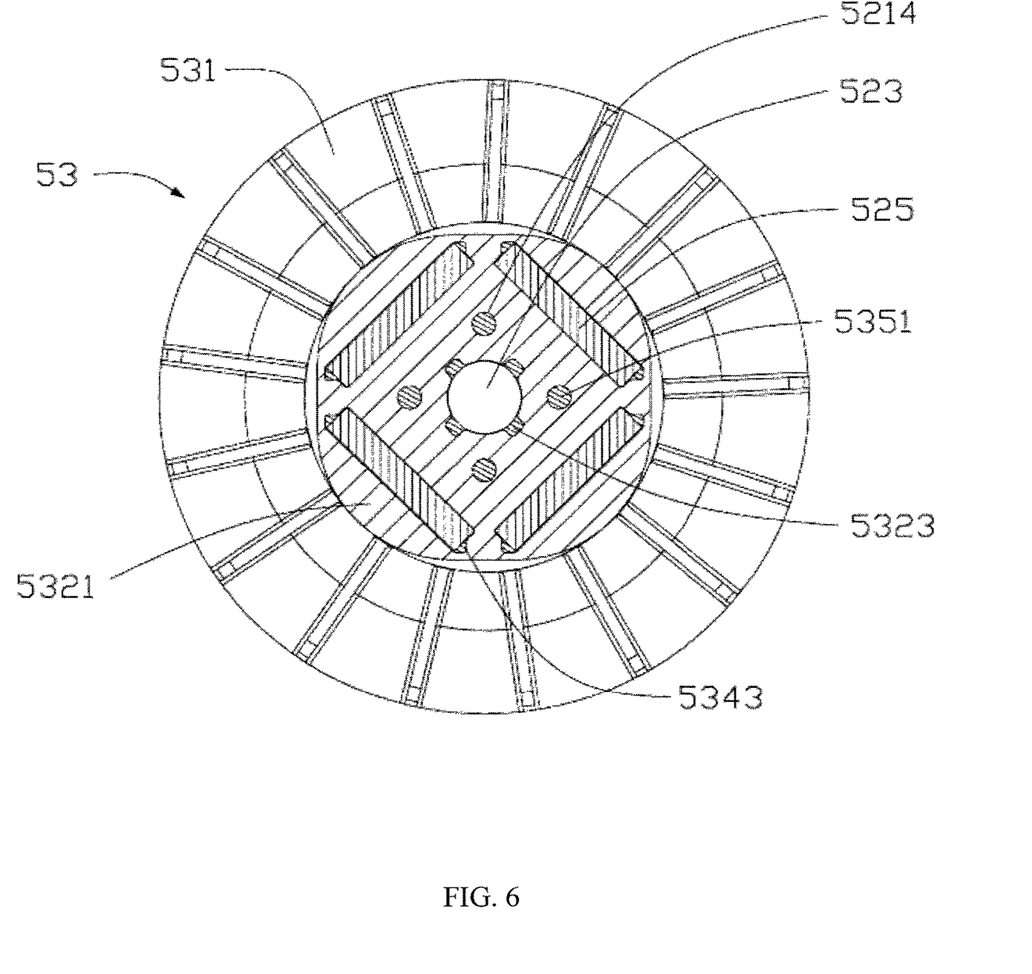
FIG. 6 is a sectional view of the rotor shown in FIG. 2 take alone line VI-VI thereof.

Referring to FIG. 5 and FIG. 6, the fan 53 can include an impeller 531, a connection portion 532, a plurality of fixing portions 534, a top cover 535 and a sleeve 536. The connection portion 532 is substantially of a cylindrical or truncated cone structure. The impeller 531 is disposed at an end of the connection portion 532, and the fixing portions 534 are disposed at the other end of the connection portion 532.

In this embodiment, a plurality of holding portions 5323 are disposed at an end surface of one end of the connection portion 532 adjacent the fixing portion 534. Each holding portion 5323 is inserted into one of the mating holes 5215, and abuts against the rotary shaft 523 accommodated in the shaft hole 5211. The fixing portions 534 are evenly arranged at one end of the connection portion 532 and are centered around the axis of the connection portion 532. The other ends of the fixing portions 534 are connected to the top cover 535.

In this embodiment, each fixing portion 534 is a hollow structure, which accommodates one permanent magnet 525 therein. Preferably, after two ends of the fixing portion 534 are connected to the connection portion 532 and the top cover 535, respectively, a hollow portion of the fixing portion 534 becomes a sealed space. A lug 5343 is disposed at and extends from each of two sides of each fixing portion 534, and matches with the air groove 5213 in shape. Each lug 5343 is accommodated in one corresponding air groove 5213. In this embodiment, the cross section of the air groove 5213 perpendicular to the axis of the rotor main body 52 is a triangle in shape, and the air groove 5213 is located at one side of the mounting groove 5212 adjacent an edge of the rotor main body 52. In manufacturing the rotor 50, the fixing portion 534 with the permanent magnet 525 accommodated therein extends through and is held in one corresponding mounting groove 5212. A number of the fixing portions 534 is equal to a number of the permanent magnets 525. In this embodiment, there are four fixing portions 534 which cooperatively define an accommodating space 5341. The rotor main body 52 is partially embedded in the accommodating space 5341.

In this embodiment, the top cover 535 is disc-shaped, which abuts against one end of the rotor core 521 for fixing the rotor main body 52. A plurality of positioning pins 5351 extends from one side of the top cover 535 facing towards the fixing portion 534. Specifically, in one embodiment where a plurality of positioning holes 5214 is defined through the rotor core 521 along a direction parallel to the axis of the rotor core 521, each positioning pin 5351 is inserted into and extends though one of the positioning holes 5214, and is connected to the connection portion 532. In another embodiment where a plurality of recesses 5216 is defined in two ends of the rotor core 521, respectively, a plurality of positioning pins 5321 is disposed at an end surface of one end of the connection portion 532 adjacent the fixing portion 534, and each positioning pin 5321 is inserted into one of the recesses 5216 adjacent the top cover 535. The sleeve 536 is disposed at one side of the top cover 535 away from the fixing portion 534. One end of the rotary shaft 523 extending out of the rotor core 521 extends sequentially through the connection portion 532 and the impeller 531, and the other end thereof extends sequentially through the top cover 535 and the sleeve 536. The sleeve 536 is used to make a tighter connection between the rotary shaft 523 and the fan 53.

Figure 7:
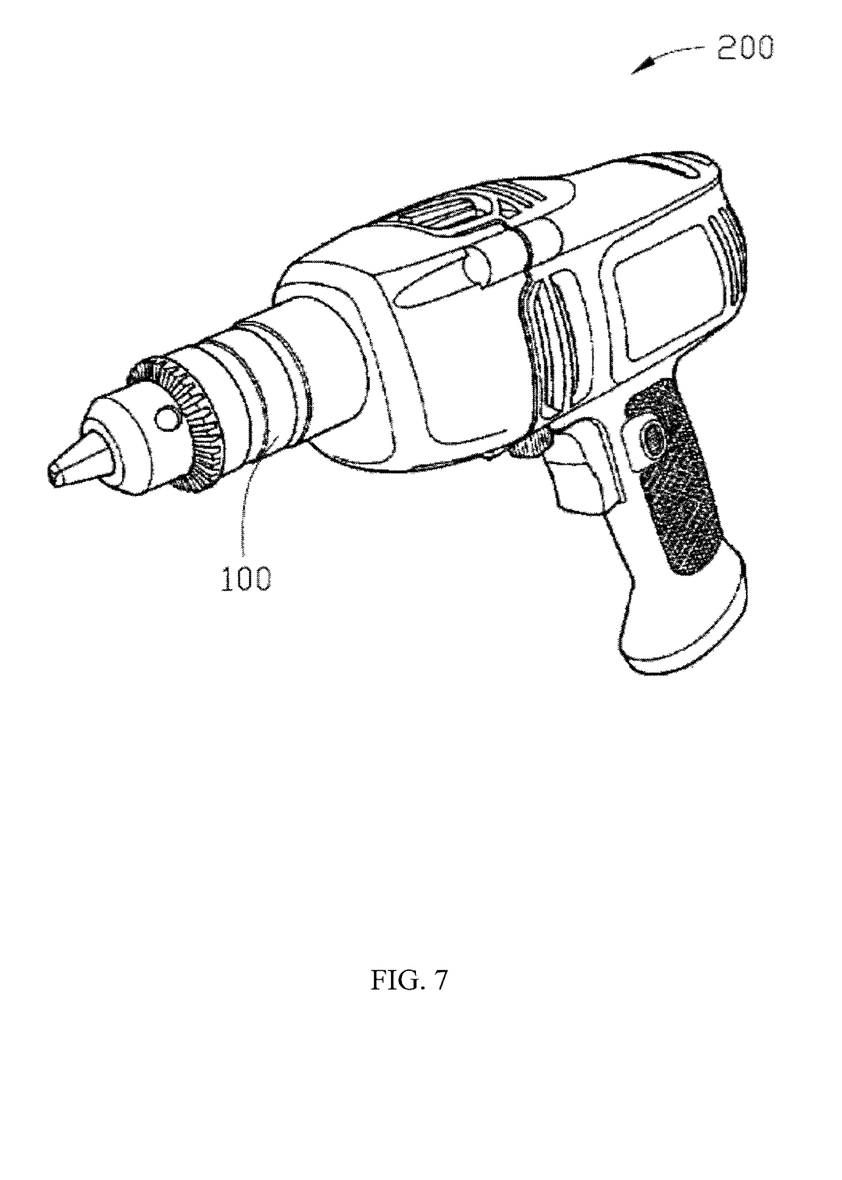
FIG. 7 is a perspective view of a power tool according to an embodiment of the present disclosure.

Referring to FIG. 7, FIG. 7 is a perspective view of the motor 100 utilized in a power tool 200. In this embodiment, the power tool 200 is an electric drill. In other embodiments, the power tool 200 may also be an electric saw, an electric hammer, and the like. The motor 100 drives a drill (not labelled) mounted at an end of the electric drill through a transmission mechanism (not shown).

The present disclosure provides a method for manufacturing a rotor of a motor, which includes the following steps.

At Step S1, a rotor core 521, a rotary shaft 523 and a plurality of permanent magnets 525 are provided. A plurality of mounting grooves 5212 is disposed in the rotary core 521, and an air groove 5213 is disposed at each of two sides of each mounting groove 5212 and communicated with the mounting groove 5212. The rotary shaft 523 extends through the rotor core 521 along an axis of the rotor core 521 and is fixed to the rotor core 521. Each permanent magnet 525 is accommodated in one of the mounting grooves 5212, thereby forming a rotor main body 52 with a preliminarily fixed shape.

At Step S2, the rotor core 521, the rotary shaft 523 and the permanent magnets 525 that have been preliminarily assembled are placed into a mold, with each permanent magnet 525 located in a middle of the mounting groove 5212.

It should be understood that the permanent magnet 525 may be mounted in the middle of the mounting groove 5212 by forming a plurality of positioning portions of foaming agent styrene on the permanent magnet 525.

It should be understood that the permanent magnet 525 may be mounted in the middle of the mounting groove 5212 by disposing the positioning portions on an inner surface of mounting groove 5212.

At Step S3, high pressure melting plastic is injected into the mold through an injection molding machine so that the melting plastic flows in the mold along runners to form the structure of a fan 53. The melting plastic is filled in the mounting groove 5212 and the air grooves 5213 to form a fixing portion 534 located at an outside of the permanent magnet 525 to wrap the permanent magnet 525, and form lugs 5343 mating with the air grooves 5213 at two sides of each fixing portion 534. The plastic filled in the positioning holes 5214 or recesses 5216 forms positioning pins 5321, 5351. The fixing portions 534 are formed via an overmolding process.

The fixing portion 534 wraps the permanent magnet 525, thereby preventing the permanent magnet 525 from being exposed to an external environment and thus avoiding corrosion. Further, the fixing portion 534 fixes the permanent magnet 525 in the mounting groove 5212. The lugs 5343 and the positioning pins 5321 (5351) make the connection between the rotor main body 52 and the fan 53 even tighter, thereby preventing the fan 53 from sliding relative to the rotor main body 52.

At Step S4, pressure is continuously applied to the mold to ensure that the fan 53 is formed at high pressure, so that the fan 53 has a greater density as well as a more stable and solid structure.

At Step S5, the mold is cooled after the pressure is kept for a preset period of time, so that the melting plastic cools to form a solid fan 53.

At Step S6, the rotor 50 composed of the rotor main body 52 and the fan 53 is removed from the mold through a demolding mechanism, thereby accomplishing the final product.

The rotor 50 of the present disclosure includes the rotor main body 52 and the fan 53 which are embedded with each other, and the fan 53 is integrally formed on the rotor main body 52 via injection molding, thereby solving the problems in the conventional rotor manufacturing process that there are an unduly large amount of assembly parts and the assembly process is complex. In addition, by forming the fixing portion 534 at the outside of the permanent magnet 525 via injection molding, the permanent magnet 525 is sealed, and it can be ensured that a position of the permanent magnet 525 will not be changed as well. Since the permanent magnet is sealed via injection molding, corrosion of the permanent magnet is prevented, and the process of applying glue before inserting the permanent magnet in the rotor can be omitted to simplify the process of assembling the rotor. The lugs 5343 extending along two sides of each fixing portion 534, used in combination with the air grooves 5213, enhance the effect of magnetic isolation, and also make the connection between the fan 53 and the rotor main body 52 even tighter.

Therefore, the technical solutions of embodiments of the present disclosure have been clearly and completely described above. Apparently, the described embodiments are merely part of, rather than all of, the embodiments of the present disclosure. A person skilled in the art may make various combinations of technical features in the various embodiments to meet practical needs. Based on the described embodiments of the present disclosure, any other embodiment obtained by a person skilled in the art without paying creative efforts shall also fall within the scope of the present disclosure.

The invention claimed is:

1. A rotor comprising:
a rotor main body, the rotor main body comprising:
a rotor core;
a rotary shaft extending through the rotor core; and
a permanent magnet mounted in the rotor core; and
a fan integrally formed on the rotor main body, the fan comprising a plurality of fixing portions embedded in the rotor main body and configured to fix the permanent magnet, wherein the fan further comprises a top cover and an impeller that are integrally disposed at two ends of the fixing portions, two ends of the rotary shaft extend through the impeller and the top cover, respectively, the rotor core is disposed between the impeller and the top cover, the permanent magnet is wrapped in the fixing portions, and the fixing portions are embedded in the rotor core, a plurality of mounting grooves is defined in the rotor core, and each of the fixing portions is accommodated in one of the mounting grooves, the fan further comprises a connection portion, the connection portion is disposed between the impeller and the fixing portion, one end of each fixing portion extending through one of the mounting grooves is connected to the connection portion, and the other end of each fixing portion is connected to the top cover.

2. The rotor of claim 1, wherein the top cover, the impeller, and the fixing portions are integrally formed through injection molding.

3. The rotor of claim 1, wherein the fixing portions wrap the permanent magnet via an over-molding process.

4. The rotor of claim 1, wherein a plurality of positioning holes is defined in the rotor core along a direction parallel to an axis of the rotor core, a plurality of positioning pins are disposed on the top cover, and each positioning pin is inserted in and extends through one of the positioning holes and is connected to the connection portion.

5. The rotor of claim 1, wherein a plurality of recesses are defined in two ends of the rotor core, respectively, a plurality of positioning pins are disposed on the connection portion and the top cover, and each positioning pin is inserted in one of the recesses.

6. The rotor of claim 1, wherein the top cover abuts against an end of the rotor core, a sleeve is disposed at a side of the top cover, and an end of the rotary shaft extends sequentially through the top cover and the sleeve.

7. The rotor of claim 1, wherein an outer circumferential surface of the rotor core is in an irregular round shape, the outer circumferential surface of the rotor core comprises a plurality of arc surfaces and a plurality of transition surfaces, and the arc surfaces and the transition surfaces are alternately arranged.

8. The rotor of claim 1, wherein the rotary shaft tightly fits the rotor core.

9. The rotor of claim 1, wherein two air grooves are disposed at two ends of each of the mounting grooves, and each air groove is communicated with one corresponding mounting groove, a lug extends from each of two side of each fixing portion, and the lug is held in one of the air grooves.

10. The rotor of claim 9, wherein a cross section of each air groove is a triangle in shape, and each air groove is located at one side of the corresponding mounting groove adjacent the corresponding transition surface.

11. A manufacturing method of the rotor of claim 1, the manufacturing method comprising:
providing a rotor core, a rotary shaft and a plurality of permanent magnets, a plurality of mounting grooves being formed in the rotary core, and an air groove being formed at each of two sides of each mounting groove and communicated with the each mounting groove;
extending the rotary shaft through the rotor core along an axis of the rotor core and fixing the rotary shaft to the rotor core, each permanent magnet being accommodated in one of the mounting grooves;
placing the rotor core, the rotary shaft and the permanent magnets that have been assembled into a mold, with each permanent magnet located in a middle of the one of the mounting grooves;
injecting high pressure melting plastic into the mold, thereby forming a fan through injection molding; and
removing the rotor composed of the rotor main body and the fan from the mold through a demolding mechanism.

12. The method of claim 11, wherein the melting plastic is filled in the mounting groove and the air grooves to form a fixing portion at an outside of the permanent magnet to wrap the permanent magnet, and form lugs mating with the air grooves at two sides of each fixing portion, and the melting plastic is filled in positioning holes to form positioning pins.

13. A motor comprising:
a stator;
an endcap disposed at an end of the stator; and
a rotor supported by the endcap and rotatably received in the stator, the rotor comprising:
a rotor main body, the rotor main body comprising:
a rotor core;
a rotary shaft extending through the rotor core; and
a permanent magnet mounted in the rotor core; and a fan integrally formed on the rotor main body, the fan comprising a plurality of fixing portions embedded in the rotor main body and configured to fix the permanent magnet, wherein the fan further comprises a top cover and an impeller that are integrally disposed at two ends of the fixing portions, two ends of the rotary shaft extend through the impeller and the top cover, respectively, the rotor core is disposed between the impeller and the top cover, the permanent magnet is wrapped in the fixing portions, and the fixing portions are embedded in the rotor core, the fan further comprises a connection portion, the connection portion is disposed between the impeller and the fixing portion, one end of each fixing portion extending through one of the mounting grooves is connected to the connection portion, and the other end of each fixing portion is connected to the top cover.

14. The motor of claim 13, wherein the top cover, the impeller, and the fixing portions are integrally formed through injection molding.

15. The motor of claim 13, wherein the fixing portions wrap the permanent magnet via an over-molding process.

* * * * *